April 13, 1965 W. W. RAND 3,177,954
SUBAQUEOUS DRILLING APPARATUS
Filed Sept. 17, 1956 3 Sheets-Sheet 1
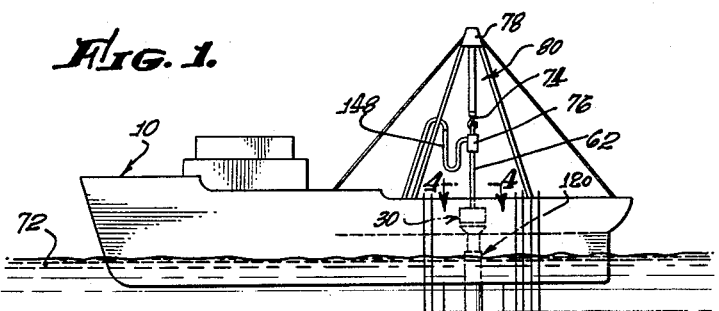
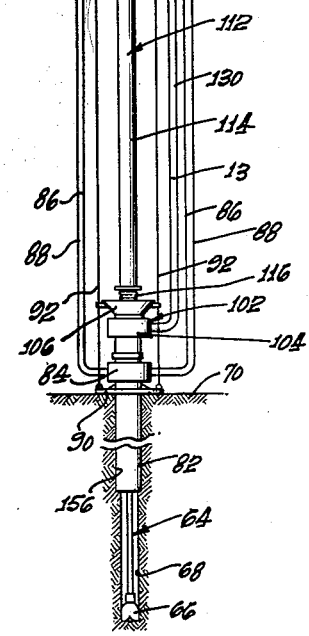
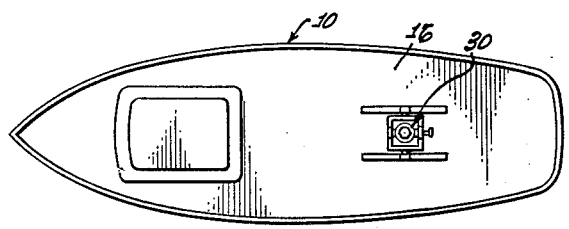
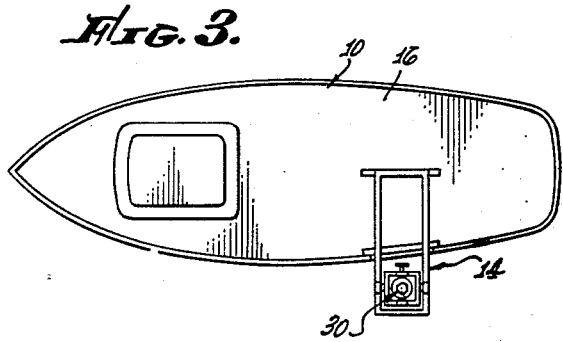
WILLIAM W. RAND,
INVENTOR.
By His Attorneys
HARRIS, KIECH, FOSTER & HARRIS April 13, 1965 W. W. RAND 3,177,954
SUBAQUEOUS DRILLING APPARATUS
Filed Sept. 17, 1956 3 Sheets-Sheet 2
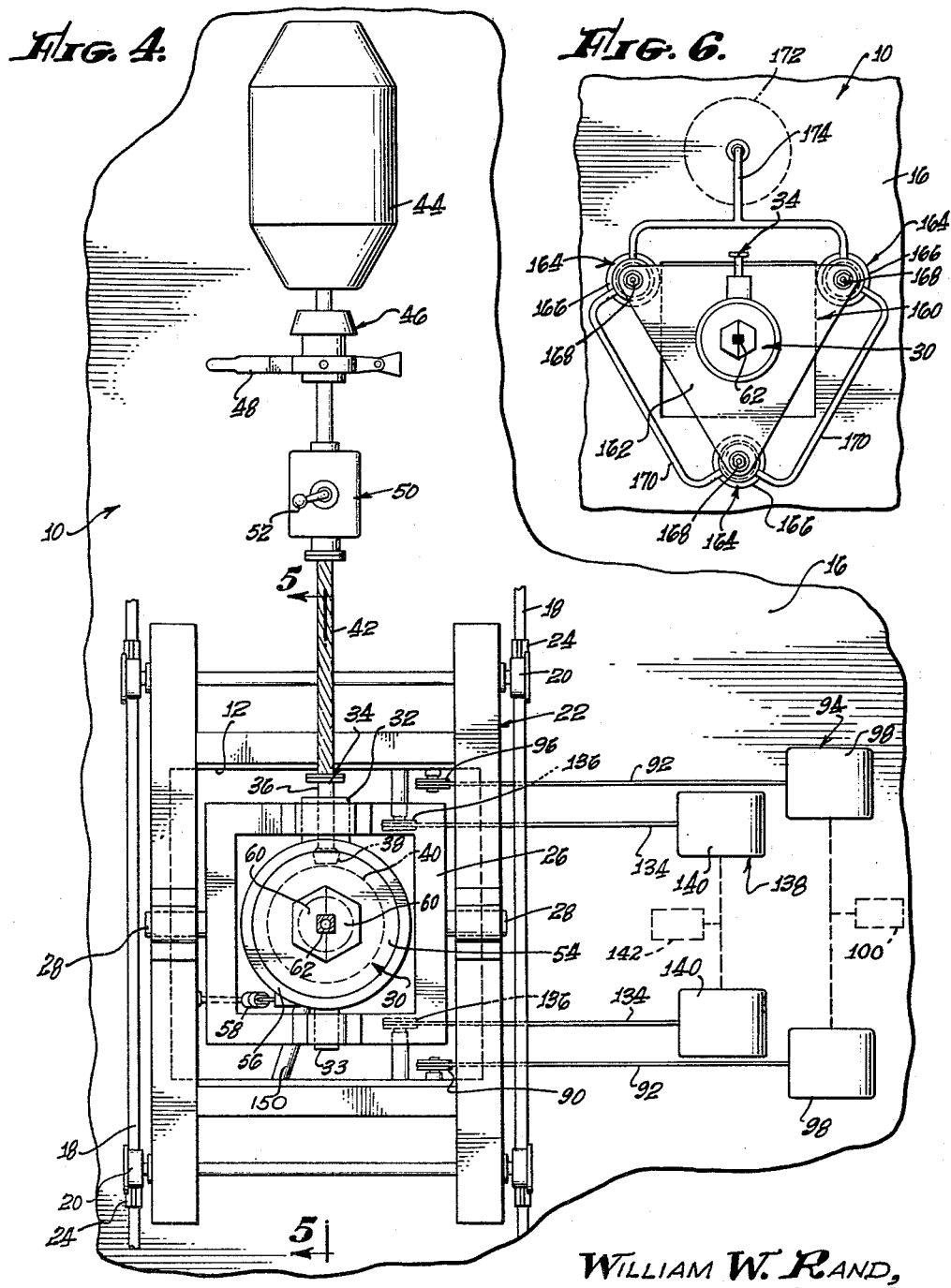
WILLIAM W. RAND,
INVENTOR.
By HIS ATTORNEYS.
HARRIS, KIECH, FOSTER & HARRIS.

[# United States Patent Office 3,177,954
Patented Apr. 13, 1965

3,177,954
SUBAQUEOUS DRILLING APPARATUS
William W. Rand, P.O. Box 1135, Santa Barbara, Calif.
Filed Sept. 17, 1956, Ser. No. 610,062
3 Claims. (Cl. 175—7)

The present invention relates in general to an apparatus for subaqueous drilling, i.e., an apparatus for drilling into the earth beneath a body of water, and a primary object of the invention is to provide an apparatus which includes a floating supporting structure or platform, such as a boat, barge, or the like, from which all the drilling operations are carried out without any necessity for supporting the platform by means of piles, extensible legs, or the like.

With the foregoing construction, the apparatus of the invention may be transported from one drilling location to another readily and may be placed in operation at a particular location, or removed from such location after drilling operations have been completed, with a minimum expenditure of time and effort, which is an important feature. Also, the present invention permits drilling in considerably deeper water than is possible with structures requiring supporting piles, legs, or the like, since there is no necessity for supporting the platform from the bottom of the body of water, which is another important feature.

An important object of the invention is to provide an apparatus for subaqueous drilling which includes a rotary table and which includes automatic orienting means connecting the rotary table to the floating platform in such a manner that a predetermined orientation for the axis of the rotary table is always maintained despite rolling or pitching of the platform due to the action of wind, waves, and the like.

Another object is to provide an orienting means for the rotary table which includes a gimbal frame between the rotary table and the supporting structure, the gimbal frame being connected to the supporting structure by outer pivots located on an outer pivot axis, the rotary table being connected to the gimbal frame by inner pivots located on an inner pivot axis, and the rotary table being pivot axis and which extends through one of the inner driven by a drive means which is coaxial with the inner pivots. With this construction, the desired axis orientation for the rotary table is always maintained and the drive means for the rotary table is always operative, despite rolling and/or pitching of the floating supporting structure.

Another object is to provide an automatic orienting means for the rotary table which includes at least three interconnected fluid motors supporting the rotary table and each connected to the rotary table and to the floating supporting structure.

Another important object of the invention is to provide a subaqueous drilling apparatus having means for positioning or locating the floating platform relative to a casing set in the earth beneath the body of water, this casing being referred to hereinafter as a "surface" casing since it performs a function somewhat analogous to that performed by the surface casing of a well drilled on dry land.

Another object of the invention is to provide an apparatus which includes an inner casing or conductor tube suspended from the floating platform and extending into the surface casing, this conductor tube serving to conduct a drill string driven by the rotary table downwardly into the surface casing.

Another object is to provide packer means forming a fluid-tight seal between the lower end of the conductor tube and the upper end of the surface casing.

Another object is to provide means for latching the lower end of the conductor tube to the upper end of the surface casing to prevent separation thereof during drilling.

Another object is to provide an upwardly facing guide funnel at the upper end of the surface casing for guiding the lower end of the conductor tube into the surface casing and the latching means as the conductor tube is lowered from the floating platform.

Another object is to provide a conductor tube which includes at least one flexible joint to compensate for lateral movement of the floating supporting structure relative to the surface casing, and to provide a conductor tube having at least one vertical slip joint to permit variations in the length of the conductor tube to compensate for vertical movement of the floating supporting structure due to wave and tide action and to compensate for lateral displacement of the floating supporting structure relative to the surface casing. With this construction, even though the lower end of the conductor tube is latched relative to the upper end of the surface casing and is sealed relative thereto by the packer means, the floating platform may move laterally and/or vertically to considerable extents without disturbing the connections between the conductor tube and the surface casing.

An important object is to provide means carried by the floating platform for supporting the conductor tube with a constant supporting force.

Still another object of the invention is to provide an apparatus including supporting lines extending between the floating platform and the conductor tube and connected to the conductor tube, and including means for maintaining constant and equal tensions in such supporting lines. With this construction, a constant supporting force is applied to the conductor tube at all times, despite lateral and/or vertical shifting of the floating platform relative to the connection between the conductor tube and the surface casing.

Another important object is to provide guide lines extending between the floating platform and the surface casing and connected to the surface casing, and to provide means carried by the floating platform for maintaining constant and equal tensions in such guide lines, a related object being to utilize such guide lines to guide the latching means and the guide funnel mentioned downwardly from the floating platform into proper engagement with the surface casing. Thus, these guide lines serve as a means for properly positioning various components of the apparatus with reference to the surface casing despite horizontal and/or vertical shifts in the location of the supporting structure relative to the surface casing, which is an important feature.

Another object is to provide an apparatus wherein the rotary table is supported either in a position outwardly of the bow, side, or stern of a boat, barge, or the like, or in a position over a well through the hull of the barge or boat.

Another object is to mount the rotary table, and its orienting means, on a carriage which may be moved between operative and inoperative positions relative to the floating platform.

Another object of the invention is to provide an apparatus having a closed drilling mud circulation system wherein the drilling mud enters the drill string adjacent the upper end thereof through a drilling mud supply line, and is discharged from the conductor tube adjacent the upper end thereof through a drilling mud return line, such a closed mud system being permitted by the interconnected conductor tube and surface casing hereinbefore discussed.

The foregoing objects, advantages, features and results of the present invention, together with various other]

objects, advantages, features and results thereof which will be apparent to those skilled in the subaqueous drilling art in the light of this disclosure, may be attained with the exemplary embodiments of the invention described in detail hereinafter and illustrated in the accompanying drawings, in which:

FIG. 1 is a side view, partially in elevation and partially in section, of a subaqueous drilling apparatus of the invention in operation;

FIG. 2 is a semidiagrammatic plan view of the embodiment of FIG. 1;

FIG. 3 is a semidiagrammatic plan view of an alternative embodiment;

FIG. 4 is an enlarged, fragmentary plan view, partially in section, taken along the arrowed line 4—4 of FIG. 1;

FIG. 6 is a plan view, partially in section, of an alternative embodiment of a rotary table orienting means of the invention.

Figure 5:
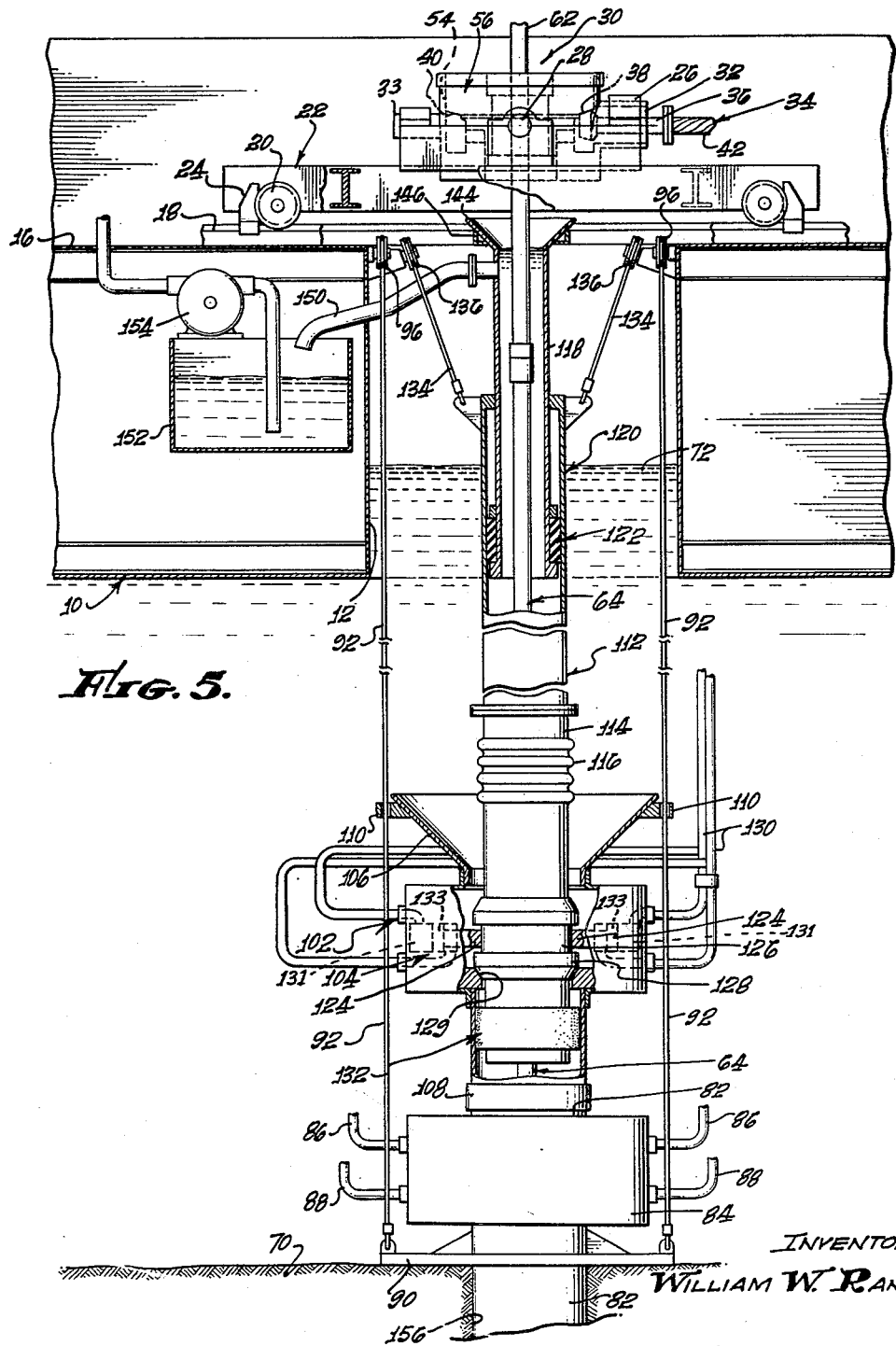
FIG. 5 is a sectional view taken along the arrowed line 5—5 of FIG. 4.

The subaqueous drilling apparatus of the invention includes a floating platform or supporting structure which is exemplified throughout the drawings as a boat 10, adapted to float on a body of water 72 it being understood that other floating platforms such as a barge, or the like, may be substituted for the boat shown. In the embodiment of the invention selected for detailed consideration, the drilling operations are carried out through a well 12, FIG. 5, extending through the hull of the boat 10. However, it will be understood that the invention is not limited thereto and that the drilling operations may be carried out from a supporting frame 14, FIG. 3, extending outwardly from the bow, side, or stern of the boat.

Considering in more detail the embodiment specifically illustrated in FIGS. 1, 2, 4 and 5 of the drawings, a deck 16 of the boat 10 carries tracks 18 on opposite sides of the well 12 through the hull of the boat. Movable along the tracks 18 are wheels 20 of a carriage 22 on which is mounted drilling equipment to be described, the carriage being movable between an operative position over the well 12 to locate such drilling equipment over the well and an inoperative position at one side of the well to leave the well unobstructed. The carriage 22 may be locked in its operative position over the well 12 by means of chocks 24 engaging the tracks 18 and the wheels 20.

As best shown in FIG. 4 of the drawings, a gimbal frame 26 is mounted on the carriage 22 by means of outer pivots 28 having a common, outer pivot axis. Within the gimbal frame 26 is a rotary table 30 having a rotor 54 rotatable within a stator 56, the latter being connected to the gimbal frame 26 by inner pivots 32 and 33 having a common, inner pivot axis perpendicular to the axis of the outer pivots 28. As will be apparent, supporting the rotary table 30 on the carriage 22 through the gimbal means just described results in a constant, usually generally vertical, orientation for the axis of the rotary table 30 despite pitching and/or rolling of the boat 10. Also, this gimbal support for the rotary table 30 permits the rotary table to tilt relative to the boat 10 to compensate for lateral displacement of the boat to one side or the other of the precise location to be drilled.

The rotary table 30 is driven by a drive means 34 coaxial with the inner pivot axis, i.e., the pivot axis between the rotary table and the gimbal frame 26. The drive means 34 includes a shaft 36 which extends axially through the inner pivot 32 and which carries a pinion gear 38 at its inner end. This pinion gear is meshed with a ring gear 40 secured to the rotor 54, whereby rotation of the drive shaft 36 through the inner pivot 32 results in rotation of the rotor.

The drive shaft 36 is driven by a flexible shaft 42 which compensates for relative tilting of the rotary table 30 and the boat 10 in any direction. This flexible shaft may take the form shown, or it may take the form of a rigid shaft equipped with universal joints and sliding splined sections, not shown. The flexible shaft 42 is driven by a motor 44 on the deck 16 through a clutch 46 operable by a lever 48 and through a variable speed transmission 50 having a speed changing lever 52.

Interconnecting the stator 56 of the rotary table 30 and the carriage 22 is a torque-compensating hydraulic shock absorber 58. This shock absorber, which, per se, is conventional, is provided with a small orifice through which fluid flows to permit the entire rotary table 30 to tilt slowly to compensate for pitching and/or rolling of the boat 10, and to compensate for lateral displacement of the boat relative to the precise point to be drilled. However, the shock absorber 58, due to the small orifice mentioned, checks any sudden movement of the rotary table 30 tending to result from sudden changes in the torque applied to the rotary table through the drive means 34, such abrupt torque changes resulting from starting or stopping of the rotary table, or from encountering obstructions to drilling.

From the foregoing it will be apparent that the structure described permits maintaining a predetermined orientation of the axis of the rotary table 30, which axis is at least substantially vertical, to compensate for pitching and/or rolling of the boat 10 and to compensate for lateral drifting of the boat from the precise location being drilled. The flexible nature of the connection between the drive motor 44 and the rotary table permits relative tilting motion of the rotary table and the boat without interference with the operation of the rotary table. The presence of the shock absorber 58 insures against sudden tilting of the rotary table due to abrupt changes in the torque applied thereto, while still permitting slow relative tilting movement between the rotary table and the boat.

The rotor 54 of the rotary table 30 carries the usual kelly bushing 60 which is engageable with a kelly 62 forming the upper end of a drill string 64 having at its lower end a bit 66, FIG. 1, for drilling a bore 68 in the earth 70 at the bottom of the body of water 72 on which the boat 10 floats. The drill string 64 is supported in the usual manner by a traveling block 74 which is connnected to the upper end of the kelly 62 by a swivel fitting 76. The traveling block 74 is suspended from a crown block 78 in the usual manner, the crown block being carried by a derrick 80 mounted on the deck 16 of the boat 10 above the well 12 through the hull thereof.

As best shown in FIGS. 1 and 5 of the drawings, a surface casing 82 is set in the earth 70 beneath the body of water 72 and lines at least an enlarged bore 156 at the upper end of the bore 68. This surface casing carries the usual blowout preventer 84 between upper and lower sections thereof. This blowout preventer may include, as is conventional, gates, not shown, controlled by hydraulic lines 86 and adapted to close around the drill string 64, and may include gates, not shown, controlled by hydraulic lines 88 and adapted to close the surface casing 82 completely when the drill string is removed therefrom. The blowout preventer may be permanently attached to the surface casing 82, or it may be removable in a manner to be described.

The surface casing 82 is provided, preferably below the blowout preventer 84, with an anchoring means 90, which is set with the casing, for at least two guide lines 92 which extend upwardly through the well 12 in the boat 10 to a means 94 carried by the boat for maintaining constant and equal tensions in the guide lines, the latter being trained over pulleys 96 at the top of the well 12. The means 94 may include fluid motors 98 respectively connected to the guide lines 92, these motors being connected to each other and to a common source of fluid pressure 100 so as to maintain equal and constant tensions in the guide lines. For example, the fluid motors may be well-known air winches connected to each other and to a common source of air pressure. With this construction, the guide lines 92 are maintained under constant and equal tensions at all times despite pitching and/or rolling of the boat 10, rising and/or falling of the boat due to wave and/or tide action, drifting of the boat horizontally relative to the axis of the bore 68 in the earth 70 below the body of water 72, and the like, which is an important feature of the invention. The tension in the guide lines 92 may be varied, as required by operating conditions, by varying the fluid pressure supplied to the means 94.

The guide lines 92 are utilized for locating the boat 10 relative to the surface casing 82 and are also utilized, in the construction illustrated, to guide a removable means or structure 102 downwardly through the well 12 in the boat 10 into operative engagement with the surface casing 82. The structure 102 includes at least a latching means 104 and an upwardly facing guide funnel 106, the functions of which will be discussed hereinafter, the lower end of the structure 102 being automatically and removably connectible to the upper end of the surface casing 82 by a suitable coupling or joint 108 between the latching means 104 and the blowout preventer 84 which coupling or joint is not specifically shown, but which is well known in the art. The structure 102, including the latching means 104 and the guide funnel 106, or these elements plus the blowout preventer 84, is guided into operative relation with surface casing 82 by the guide lines 92 through the expedient of stringing the guide lines through eyes 110 carried by the structure 102, the eyes 110 being formed on the guide funnel 106 in the particular construction illustrated.

With the foregoing arrangement, the structure 102 is automatically guided into its proper operative position relative to the surface casing 82 by the guide lines 92, even though the axis of the well 12 in the boat 10 is offset laterally to one side of the axis of the surface casing 82 to a substantial extent.

It will be understood that, if desired, the structure 102 may also be permanently attached to the surface casing 82 before lowering the latter into the bore 156, in which case the guide lines 92 may be utilized to lower the structure 102 and the casing 82 and to perform a locating function thereafter.

Extending downwardly through the well 12 in the boat 10 into the upper end of the surface casing 82 is a conductor tube 112 which houses that portion of the drill string 64 which is between the surface casing and the rotary table 30. The conductor tube 112 includes a lower section 114 having therein a flexible joint 116 which permits lateral displacement of the axis of the well 12 relative to the axis of the surface casing 82. The conductor tube 112 also includes an upper section 118 which is connected to the lower section 114 by a slip joint 120, thereby permitting relative vertical movement of the upper and lower sections to compensate for rising and falling of the boat 10 due to wave action, tide action, and the like. As shown, the slip joint 120 includes a piston means 122 carried by the upper section 118 within and making a fluid-tight sliding fit with the lower section 114.

The conductor tube 112 is adapted to be lowered into the upper end of the surface casing 82 through the guide funnel 106 and the latching means 104, the purpose of the guide funnel being to align the lower end of the conductor tube with the latching means and the surface casing. Thus, proper insertion of the conductor tube through the latching means 104 into the surface casing 82 is assured. Considering the function of the latching means 104, it includes two latch elements 124 insertable into and adapted to close around a reduced-diameter portion 126 of a latching mandrel 128 on the conductor tube 112, the mandrel being engageable with a seat 129 to align the portion 126 with the latch elements 124. The latter are preferably hydraulically actuated and are controlled from the boat 10 through hydraulic lines 130. These lines are connected to opposite ends of cylinders 131 in which are disposed pistons 133 connected to the latch elements 124. By pressurizing the lines 130 alternately, the elements 124 are alternately moved inwardly and outwardly. As will be apparent, after the lower end of the conductor tube 112 has been guided into alignment with the latching means 104 and the surface casing 82 by the guide funnel 106, and has been inserted through the latching means into the upper end of the surface casing, the latching means may be energized from the boat by pressurizing the proper line 130 to close the latch elements 124 on the reduced-diameter portion 126 of the latch mandrel 128, thereby latching the conductor tube to the surface casing so that it is anchored thereto.

A packer means 132 is provided between the lower end of the conductor tube 112 and the upper end of the surface tubing 82 to provide a fluid-tight seal therebetween, thereby excluding water from the conductor tube and the surface casing, and confining drilling mud in the drilling mud system to be described within the conductor tube and the surface casing. The packer means 132 may be carried by the conductor tube 112 for insertion into the surface casing 82 through the guide funnel 106 and the latching means 104, or it may be carried by the surface casing for insertion of the lower end of the conductor tube thereinto.

The weight of the conductor tube 112 is carried by supporting lines 134 which are connected to the upper end of the lower section 114 of the conductor tube and which are trained over pulleys 136 at the upper end of the well 12 in the boat 10, these supporting lines being connected to a means 138 for maintaining constant and equal tensions therein. The means 138 is similar to the means 94, and is shown as including fluid-operated motors 140 respectively connected to the supporting lines 134, the motors 140 being connected together and to a common source of fluid pressure 142. The motors 140 may, for example, be well-known air winches. Thus, with this construction, the weight of the conductor tube 112 is supported from the boat 10 in such a manner that a constant supporting force is applied thereto at all times despite vertical or lateral movement of the boat relative to the surface casing, this being accomplished by maintaining constant and equal tensions in the supporting lines 134 in the manner discussed.

The upper end of the upper section 118 of the conductor tube 112 is provided with an upwardly facing guide funnel 144 which serves to guide the drill bit 66 into the conductor tube as the drill string is lowered thereinto. This guide funnel also performs another function, viz., it serves as a mud leveling device and as a mud accumulator to take care of surges in the level of the mud system to be described in subsequent paragraphs. The funnel 144 rests on and is supported by a frame 146 which flexibly attaches the upper section 118 of the conductor tube 112 to the boat 10, the slip joint 120 permitting upward and downward movement of the upper section 118 of the tube relative to the lower section 114 thereof in response to vertical or horizontal displacement of the boat 10 relative to the surface casing 82.

Considering the drilling mud system mentioned, this is a closed system by means of which drilling mud is circulated from a mud tank, not shown, through the bore 68 and back to the mud tank. Drilling mud is delivered from the mud tank to a flexible drilling mud supply line 148, FIG. 1, by a mud pump, not shown. The supply line 148 is connected to the kelly 62 adjacent the upper end thereof to deliver drilling mud into the interior of the drill string 64, the drilling mud flowing downwardly through the drill string and out the bit 66. The drilling mud then flows upwardly through the annulus between the drill string 64 and the wall of the bore 68, carrying with it cuttings removed by the bit. The cutting-laden drilling mud flowing upwardly through this annulus flows into the annulus between the drill string 64 and the surface casing 82, and then flows into the annulus between the drill string 64 and the lower section 114 of the conductor tube 112, the packer means 132 providing a fluid-tight seal at the junction of the surface casing and the lower section of the conductor tube. From the annulus between the lower section 114 of the conductor tube 112 and the drill string 64, the drilling mud, laden with cuttings, flows upwardly through the annulus between the drill string and the upper section 118 of the conductor tube, to a point just below the guide funnel 144 at the top of the conductor tube. At this point the cutting-laden drilling mud flows through a drilling mud return line 150 into a mud sump 152 in which the cuttings are collected. A mud pump 154 returns clean drilling mud to the mud tank hereinbefore mentioned, for recirculation throughout the closed drilling mud system.

Considering the operation of the invention, it will be assumed that the surface casing 82 is used without a larger casing around it, and that at least the latching means 104 and the guide funnnel 106 are installed subsequently, in which case the initital operation to be performed is to set the surface casing 82, with the blowout preventer 84 thereon, in the earth 70 below the body of water 72, which may be accomplished in various ways. For example, it may be accomplished by positioning the well 12 through the boat 10 over the desired location and drilling the enlarged bore 156 with the equipment on the boat, the surface casing 82 and the blowout preventer 84 then being lowered into the enlarged bore 156 by means of the guide lines 92. If desired, the surface casing 82 may be cemented in place with any conventional procedure.

While it was assumed above that the blowout preventer 84 is installed on the surface casing 82 at the time it is set in the earth 70 below the body of water 72, it will be understood that, as hereinbefore explained, the blowout preventer may also be lowered into place subsequently by making it a part of the structure 102.

With the surface casing 82 in place, and with the carriage 22 moved to its inoperative position at one side of the well 12, the structure 102 is lowered through the well 12 on the guide lines 92 into operative engagement with the surface casing, the means 94 being energized to maintain constant and equal tensions in the guide lines. With this procedure, the guide lines serve as a locating means between the boat 10 and the surface casing 82 to insure proper engagement between the structure 102 and the surface casing.

As hereinbefore explained, however, the blowout preventer 84, the latching means 104 and the guide funnel 106 may also be lowered with the surface casing as a unit.

Once the structure 102 has been properly positioned relative to the surface casing 82, the conductor tube 112 is lowered into place through the well 12 in the boat 10, the guide funnel 106 serving to align the conductor tube with and guide it into the upper end of the surface casing. Once the conductor tube has been inserted into the surface casing, the latching means 104 is energized through the hydraulic lines 130 to move the latch elements 124 inwardly into closing engagement around the reduced-diameter portion of the latch mandrel 128, thereby anchoring the lower end of the conductor tube to the surface casing. The means 138 for maintaining constant and equal tensions in the supporting lines 134 is energized, whereby these supporting lines carry the weight of the conductor tube 112, and apply thereto a constant supporting force despite movement of the boat 10 vertically and/or horizontally relative to the surface casing. As hereinbefore explained, the flexible joint 116 in the conductor tube 112 permits lateral movement of the boat 10 relative to the surface casing 82, while the slip joint 120 compensates for vertical and horizontal movement of the boat relative to the surface casing.

The foregoing accomplished, the carriage 22 is wheeled into its operative position over the well 12 and the drill string 64 with the bit 66 thereon is lowered through the rotary table 30, the conductor tube 112, and the surface casing 82 into engagement with the bottom of the bore 156. It will be understood that the kelly bushing 60 carried by the rotor 54 of the rotary table 30 is removed for the foregoing operation, and that the guide funnel 144 at the upper end of the conductor tube 112 serves to align the drill string 64 with and to guide the bit 66 into the conductor tube. Next, the kelly bushing 60 is installed to provide a torque-transmitting connection between the rotor 54 of the rotary table 30 and the kelly 62. Thereafter, the motor 44 is activated and the clutch is engaged, whereupon the rotor 54 of the rotary table is driven through the driving connections hereinbefore discussed, whereby the bit 66 drills the bore 68. As will be understood, the gimbal means connecting the rotary table 30 to the carriage 22 permits relative tilting movement of the boat 10 and the rotary table to compensate for pitching and/or rolling of the boat, lateral displacement of the boat so that the axis of the well 12 therethrough is out of alignment with the axis of the surface casing 82, and the like. Extending the drive means 34 for the rotary table through one of the inner pivots 32 of the gimbal system permits driving of the rotary table irrespective of the relative angular positions of the rotary table and the boat 10.

As the rotary table 30 is operated in the foregoing manner to rotate the bit 66 and to cause it to drill the bore 68, the drilling mud system is placed in operation, drilling mud from the mud tank, not shown, being delivered to the kelly 62 through the drilling mud supply line 148, the drilling mud then flowing downwardly through the drill string 64 and out through the bit 66 into the annulus between the drill string and the wall of the bore 68. The drilling mud carries cuttings removed by the bit 66 upwardly through the annuli between the drill string 64 and the wall of the bore 68, between the drill string 64 and the surface casing 82, between the drill string 64 and the lower section 114 of the conductor tube 112, and between the drill string 64 and the upper section 118 of the conductor tube 112. From the annulus last mentioned the cutting-laden drilling mud flows through the drilling mud return line 150 into the mud sump 152.

As will be apparent, the subaqueous drilling apparatus heretofore disclosed may be transported from one location to another readily and may be set up in or removed from a particular location with a minimum expenditure of time and effort, there being no necessity for providing supporting means between the earth 70 below the body of water 72 and the supporting structure for the drilling equipment. The use of the guide lines 92 for the structure 102 provides for quick and easy positioning of this structure in operative relation with the surface casing 82, and the guide funnel 106 provides for quicka nd easy positioning of the conductor tube, the guide funnel 144 facilitating insertion of the drill string 64 into the conductor tube. Since the supporting lines 134 apply a constant supporting force to the conductor tube 112 despite shifting of the boat 10 relative to the surface casing 82, the surface casing is not relied upon to carry the weight of the conductor tube, the latching means 104 merely serving to anchor the lower end of he conductor tube relative to the surface casing. The flexibility built into the drive system for the rotary table and into the conductor tube permits substantial shifting of the boat 10 relaive to the surface casing 82 both horizontally and vertically without affecting the operation of the system. Also, the conductor-tube structure disclosed, and the disclosed relationship between the conductor tube 112 and the surface casing 82, permits the use of the closed drilling mud system described, which is advantageous.

Turning now to FIG. 6 of the drawings, illustrated therein is an alternative rotary-table orienting means for compensating for relative tilting of the rotary table 30 and the boat 10, this orienting means being designated generally by the numeral 160. As illustrated in FIG. 6, the rotary table 30 is carried by a supporting frame 162 which is connected to the structure of the boat 10 by at least three fluid motors 164. In the particular structure shown, the fluid motors include cylinders 166 pivotally connected to the structure of the boat and have therein pistons, not shown, equipped with piston rods 168 connected to the supporting frame 162. The cylinders 166 are interconnected by lines 170, these lines being connected to a common source of fluid pressure, such as a hydraulic accumulator 172, by a line 174. As will be apparent, with this structure the supporting frame 162 will always be maintained in a position providing a predetermined orientation for the axis of the rotary table 30, despite relative tilting movement of the rotary table and the boat 10. Normally, the rotary table axis will be vertical, or substantially vertical, it being understood that the rotary table axis may be considerably off vertical in the event that the position of the boat 10 shifts laterally relative to the bore being drilled.

Although I have disclosed exemplary embodiments of my invention herein for purposes of illustration, it will be understood that various changes, modifications and substitutions may be incorporated in such embodiments without departing from the spirit of the invention as defined by the following claims.

I claim:

1. In a subaqueous drilling apparatus, the combination of: supporting means adapted to float on a body of water; submerged anchoring means including a casing set in the earth below the body of water; flexible guide lines extending between and connected to said supporting means and said anchoring means; a tubular well head structure connected to said anchoring means in communication with said casing, at least part of said well head structure being releasable and engaging and being movable vertically along said guide lines between said supporting means and said anchoring means; a conductor tube extending between said supporting means and said well head structure; flexible supporting lines extending between and connected to said supporting means and said conductor tube and supporting said conductor tube; latch means releasably connecting said conductor tube to said well head structure with said conductor tube in communication with said well head structure; packer means providing a fluid-tight seal between said conductor tube and said well head structure; a drill string extending downwardly through said conductor tube and said well head structure into said casing and having a drill bit at its lower end; means on said supporting means for supporting said drill string; means on said supporting means for rotating said drill string; a drilling mud supply line connected to said drill string adjacent the upper end thereof; and a drilling mud return line connected to said conductor tube adjacent the upper end thereof.

2. An apparatus as set forth in claim 1 wherein said latch means is a fluid operated latch means carried by said well head structure and engageable with said conductor tube, said apparatus including operating fluid supply lines extending between said latch means and said supporting means and connected to said latch means.

3. An apparatus according to claim 1 including: gaseous-fluid-operated motors carried by said supporting means and respectively connected to said guide lines; other gaseous-fluid-operated motors carried by said supporting means and respectively connected to said supporting lines; means for supplying gaseous fluid at constant and equal pressures to the motors first mentioned; and means for supplying gaseous fluid at constant and equal pressures to said other motors.

References Cited by the Examiner
UNITED STATES PATENTS

| | | | |
|---|---|---|---|
| 285,628 | 9/83 | Jones et al. | 175—5 |
| 962,019 | 6/10 | Flood et al. | 61—69 |
| 1,175,725 | 3/16 | Dunbar | 175—10 |
| 1,268,082 | 6/18 | Becwith | 114—51 |
| 1,398,541 | 11/21 | Deam | 114—51 |
| 1,668,559 | 5/28 | Hansen | 175—10 |
| 1,766,628 | 6/30 | Grant | 175—10 |
| 1,810,248 | 6/31 | Jones et al. | 254—173 |
| 1,919,611 | 7/33 | Besigk | 173—6 |
| 2,215,928 | 9/40 | Hornbrook | 173—57 |
| 2,512,783 | 6/50 | Tucker | 175—6 |
| 2,598,454 | 5/52 | Smith | 175—87 |
| 2,606,003 | 8/52 | McNeill | 175—7 |
| 2,672,312 | 3/54 | Drueding | 248—182 |
| 2,681,783 | 6/54 | Smith | 248—182 |
| 2,783,970 | 3/57 | Gillespie | 137—344 |
| 2,808,229 | 10/57 | Bauer et al. | 175—7 |
| 2,854,215 | 9/58 | Cox et al. | 166—46 |
| 2,891,770 | 6/59 | Bauer et al. | 175—7 |
| 3,015,360 | 1/62 | Stratton | 175—7 X |
| 3,017,934 | 1/62 | Rhodes et al. | 175—7 |
| 3,032,125 | 5/62 | Hiser et al. | 175—7 |

CHARLES E. O'CONNELL, *Primary Examiner.*

BENJAMIN BENDETT, *Examiner.*

UNITED STATES PATENT OFFICE
CERTIFICATE OF CORRECTION

Patent No. 3,177,954

April 13, 1965

William W. Rand

It is hereby certified that error appears in the above numbered patent requiring correction and that the said Letters Patent should read as corrected below.

Column 1, lines 42 and 43, for "pivot axis and which extends through one of the inner driven by a drive means which is coaxial with the inner" read -- driven by a drive means which is coaxial with the inner pivot axis and which extends through one of the inner --; column 8, line 57, for "quicka nd" read -- quick and --.

Signed and sealed this 14th day of September 1965.

(SEAL)
Attest:

ERNEST W. SWIDER
Attesting Officer

EDWARD J. BRENNER
Commissioner of Patents